(12) United States Patent
Kloft et al.

(10) Patent No.: US 9,791,015 B2
(45) Date of Patent: Oct. 17, 2017

(54) DEVICE FOR RECOVERING ENERGY

(75) Inventors: Peter Kloft, Ransbach-Baumbach (DE);
Daniel Feld, Saarbrücken (DE);
Herbert Baltes, Losheim (DE); Frank Bauer, Marpingen (DE)

(73) Assignee: HYDAC TECHNOLOGY GMBH, Sulzbach/Saar (DE)

( * ) Notice: Subject to any disclaimer, the term of this patent is extended or adjusted under 35 U.S.C. 154(b) by 1129 days.

(21) Appl. No.: 12/926,599

(22) Filed: Nov. 29, 2010

(65) Prior Publication Data
US 2012/0023920 A1   Feb. 2, 2012

(30) Foreign Application Priority Data

Jul. 27, 2010 (DE) .......... 10 2010 032 415

(51) Int. Cl.
*F16F 9/36*  (2006.01)
*E02F 9/22*  (2006.01)
(Continued)

(52) U.S. Cl.
CPC ............. *F16F 9/365* (2013.01); *B66C 13/28* (2013.01); *B66F 9/22* (2013.01); *E02F 3/425* (2013.01);
(Continued)

(58) Field of Classification Search
CPC .......... B66C 13/28; B66F 9/22; E02F 9/2217; E02F 3/425; F16F 2230/48; F16F 9/365;
(Continued)

(56) References Cited

U.S. PATENT DOCUMENTS 2,111,792 A * 3/1938 Laugaudin ............... D04B 9/46
267/64.15
2,737,384 A * 3/1956 Laugaudin ............ F16F 9/0218
188/317
(Continued)

FOREIGN PATENT DOCUMENTS

DE         43 41 660 A1    6/1995
DE         100 06 013 A1   8/2001
(Continued)

OTHER PUBLICATIONS

"Modeling the transisent natural convection in gas-filled, variable volume cylindrical enclosures with applications to hydraulic accumulators". Pourmovahed, Ahmad. 1985.*
(Continued)

*Primary Examiner* — Nathaniel Wiehe
*Assistant Examiner* — Michael Quandt
(74) *Attorney, Agent, or Firm* — Wenderoth, Lind & Ponack, L.L.P.

(57) ABSTRACT

A device recovers energy in working machines with at least one power drive actuated to move a load mass back and forth and with an energy storage system (16) absorbing the energy released in the movement of the load mass in one direction and making it available for a subsequent movement in the other direction. The energy storage system includes an accumulator cylinder (16) mechanically coupled to the load mass and storing pneumatic pressure energy for movement in one direction. For movement in the other direction, the accumulator cylinder acts as an auxiliary working cylinder supporting the power drive and converting the stored pressure energy into driving force.

26 Claims, 5 Drawing Sheets

(51) Int. Cl.
*B66C 13/28* (2006.01)
*B66F 9/22* (2006.01)
*E02F 3/42* (2006.01)
*F16F 9/02* (2006.01)
*F15B 1/02* (2006.01)
*F15B 21/14* (2006.01)
*F16J 15/40* (2006.01)

(52) U.S. Cl.
CPC ............ *E02F 9/2217* (2013.01); *F15B 1/024* (2013.01); *F15B 21/14* (2013.01); *F16F 9/0236* (2013.01); *F16F 9/36* (2013.01); *F16F 2230/48* (2013.01); *F16J 15/40* (2013.01)

(58) Field of Classification Search
CPC ...... F16F 9/36; F16F 9/06; F16F 9/362; F16J 15/40; F16J 15/46; F16J 15/48
USPC .... 60/413, 414, 416, 372, 408, 327; 91/390; 92/134, 108, 107; 405/224.4; 188/322.16–18
See application file for complete search history.

(56) References Cited

U.S. PATENT DOCUMENTS

| | | | |
|---|---|---|---|
| 3,314,657 A * | 4/1967 | Prud Homme et al. | 254/392 |
| 3,363,792 A * | 1/1968 | Hoppe | 414/713 |
| 3,718,316 A * | 2/1973 | Larralde et al. | 254/277 |
| 3,869,861 A * | 3/1975 | Case | 60/413 |
| 3,905,580 A * | 9/1975 | Hooper | 60/413 |
| 3,971,213 A * | 7/1976 | Kelley | 60/372 |
| 4,347,049 A * | 8/1982 | Anderson | 417/403 |
| 4,487,150 A * | 12/1984 | Shanks | 114/264 |
| 4,548,389 A * | 10/1985 | Smith | F16F 9/365 188/322.16 |
| 4,615,542 A * | 10/1986 | Ideno et al. | 285/11 |
| 4,709,790 A * | 12/1987 | Freitag et al. | 188/300 |
| 4,886,397 A * | 12/1989 | Cherbonnier | 405/195.1 |
| 5,011,121 A * | 4/1991 | Oriola et al. | 267/64.11 |
| 5,209,302 A * | 5/1993 | Robichaux et al. | 166/355 |
| 5,465,811 A * | 11/1995 | Katz | 184/24 |
| 5,477,677 A * | 12/1995 | Krnavek | 60/414 |
| 5,865,028 A * | 2/1999 | Klauk et al. | 60/413 |
| 6,047,797 A * | 4/2000 | Popjoy | 188/269 |
| 6,497,059 B1 * | 12/2002 | Downer, Jr. | 37/342 |
| 6,918,247 B1 * | 7/2005 | Warner | 60/414 |
| 7,008,340 B2 * | 3/2006 | Williams et al. | 474/101 |
| 7,011,193 B2 * | 3/2006 | Lemmens et al. | 188/322.17 |
| 7,021,609 B2 * | 4/2006 | Kimura | F16F 9/36 184/6.14 |
| 7,108,016 B2 * | 9/2006 | Moskalik et al. | 138/31 |
| 7,434,391 B2 * | 10/2008 | Asam et al. | 60/414 |
| 2006/0021833 A1 * | 2/2006 | Runkel | 188/314 |
| 2007/0068754 A1 * | 3/2007 | Furgala | 188/322.21 |
| 2007/0196182 A1 * | 8/2007 | Ellis | 405/224.4 |
| 2010/0018195 A1 * | 1/2010 | Stanger et al. | 60/414 |

FOREIGN PATENT DOCUMENTS

| | | | |
|---|---|---|---|
| DE | 102007050350 | * | 4/2009 |
| EP | 2146009 | * | 1/2010 |
| FR | 1391524 | * | 3/1965 |
| GB | 1432124 | * | 4/1976 |
| WO | WO2004113622 | * | 12/2004 |

OTHER PUBLICATIONS

DE102007050350 machine translation to English. From espacenet. 2009.*
FR1391524 English translation from Espacenet.*

* cited by examiner

DEVICE FOR RECOVERING ENERGY

FIELD OF THE INVENTION

The invention relates to a device for recovering energy in working machines. The device has at least one power drive actuatable to move a load mass back and forth, and an energy storage system absorbing the energy released in the movement of the load mass in one direction and permitting a subsequent movement in the other direction.

BACKGROUND OF THE INVENTION

Devices of this type for recovery of potential energy in working machines are prior art; see, for example, WO 93/11363 or EP 0 789 816 B1. As energy storage systems, such devices have pressure accumulators storing the released potential energy as pressure energy of a working gas. It is crucial for the efficiency of these devices that the lowest possible energy losses occur in operation. The losses involve primarily losses of thermal energy of the accumulator gas. Generally, a large part of the thermal energy forming when the working gas is compressed is released via the outer walls of the hydraulic accumulator used in the prior art as an energy storage system. The large-area contact region between the working gas and the exterior can lead to considerable heat losses for the relatively large surface of the accumulator housing (preferably of steel) under consideration.

SUMMARY OF THE INVENTION

An object of the invention is to provide an improved energy recovery device characterized by a greatly improved energy balance with an especially simple and money-saving design.

According to the invention, this object is basically achieved by a device comprising an energy storage system in the form of an accumulator cylinder. The accumulator cylinder is mechanically coupled to the load mass and stores pneumatic pressure energy for movement in one direction. For movement in the other direction, the accumulator cylinder acts as an auxiliary working cylinder supporting the power drive and converting the stored pressure energy into driving force.

Preferred, the accumulator cylinder as the auxiliary working cylinder is coupled to a load mass to be raised and lowered and stores potential energy released in lowering processes in the form of pneumatic pressure energy.

The use of an energy storage system in the form of an accumulator cylinder as a replacement of conventional hydraulic accumulators improves the energy balance in more than one respect. On the one hand, the direct mechanical coupling of the accumulator cylinder to the load mass allows the stored pressure energy to be converted directly into lifting force so that the accumulator cylinder acts as an additional power drive, and results in the elimination of the hydraulic system required in the prior art between the hydraulic accumulator and power drive. The associated energy losses, which otherwise occur, are then eliminated. Furthermore, an accumulator cylinder, when compared to a hydraulic accumulator, affords considerably more design options for reducing the direct heat loss of the working gas.

This direct heat loss can be reduced quite significantly and especially advantageously, when the piston rod of the accumulator cylinder is a hollow, end-side open part forming the piston whose cavity in the position fully retracted into the cylinder contains essentially the entire volume of the working gas. In this construction of the piston, generation of heat takes place when the piston rod is lowered within the piston, that is, in a region isolated from the cylinder wall by the wall of the hollow piston. The piston is dimensioned such that in its cavity it contains essentially the entire volume of the working gas. When the piston is fully retracted in this operating state corresponding to the strongest compression, and to the greatest generation of heat, the piston wall extends over the entire length of the cylinder so that it is double walled in this state of greatest generation of heat. Heat loss is thus minimized.

On the other hand, in this construction, as a result of the specific overall length of the piston, in the fully extended position its wall with a corresponding flat portion is outside the cylinder wall. In this fully extended position, the working gas has cooled in response to the expansion. At the same time, for this piston position the wall surface exposed to the exterior and formed from a cylinder surface and the exposed jacket surface of the piston, has a maximum value. Accordingly, the thermal resistance of the total wall area is minimal so that a relatively large amount of thermal energy is absorbed from the ambient air and is released to the cooled working gas. This construction results in an optimal energy balance.

Not only does the double wall arrangement present in certain sections contribute to optimization of the thermal energy balance, but also of the working or operating medium enclosed in the double wall, for example, in the form of a working gas and/or in the form of hydraulic oil.

The accumulator cylinder can be formed in the shape of a cup having closed bottom with a filler port for the working gas, such as $N_2$.

In especially advantageous exemplary embodiments, on the open end of the accumulator cylinder, opposite the bottom, a guide is formed to guide the outside of the piston at a distance from the inner wall of the cup, which distance forms an oil gap.

Preferably, on the open end of the piston, a second guide is formed guiding the end of the piston while maintaining the oil gap. In this way, the piston can be guided without problems.

In particular, together with an oil charge located in the oil gap, a high pressure sealing system can be formed working reliably in long-term operation even in applications with high pressures, for example, of more than 100 bar.

To accommodate the oil that is displaced when the piston is extended and with the resulting reduction of the length of the oil gap and to make it available again upon retraction, a hydraulic accumulator can be connected to the oil gap. The accumulator then compensates for changes of the volume of the oil gap when the piston moves.

In especially advantageous exemplary embodiments, the accumulator cylinder is used as an auxiliary working cylinder mechanically shunted to a hydraulic working cylinder which can be actuated by the hydraulic system and which is used as a power drive. This structure enables an especially simple construction, especially for hoists, crane booms, and the like, where hydraulic cylinders are provided as a power drive acting directly on the load mass.

Since the prior art recovered energy is available in the form of hydraulic pressure energy from a hydraulic accumulator, the recovered energy can be used only for hydraulic power drives such as working cylinders or hydraulic motors. In contrast, the invention can be used in conjunction with any power drives which need not be able to be hydraulically actuated, for example, in spindle drives, cable pulls, or the like, which are activated by an electric motor and which are provided for the lifting of loads.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
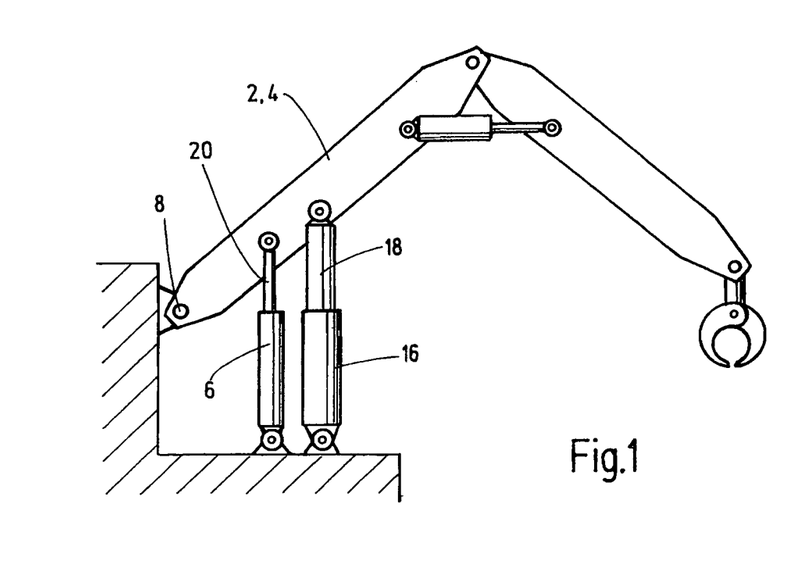
FIG. 1 is a schematically simplified, side elevational view of a crane boom, provided with one exemplary embodiment of the device according to the invention for recovering potential energy.
Figure 2:
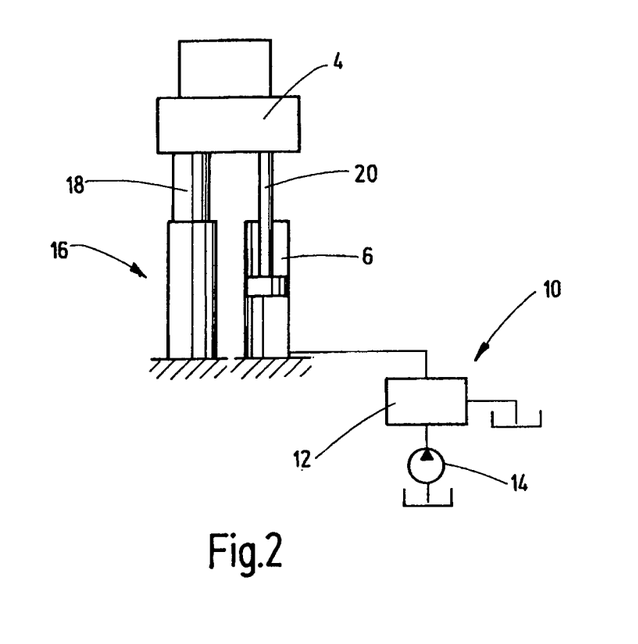
FIG. 2 is a side elevational view, symbolically representing an accumulator cylinder in mechanical shunting to a working cylinder for explaining the operating principle of the invention.

The invention is explained below using exemplary embodiments in which a crane boom 2 forms a load mass 4 (FIG. 2). The boom 2 can be raised by a power drive in the form of a hydraulic working cylinder 6. More specifically, boom 2 can be pivoted around a coupling point 8. The working cylinder 6 is a hydraulic cylinder which can be actuated by a hydraulic system 10 symbolically represented only in FIG. 2. The hydraulic system 10 is only shown with a control valve arrangement 12 and a hydraulic pump 14 in FIG. 2, can be, in particular, of a design that is conventional for working machines, so that it need not be described in detail.

An accumulator cylinder 16 is mechanically shunted to the working cylinder 6 forming the power drive. Specifically the piston rod 18 of the accumulator cylinder 16, like the piston rod 20 of the working cylinder 6, acts directly on the load mass 4 (boom 2).

Figure 3:
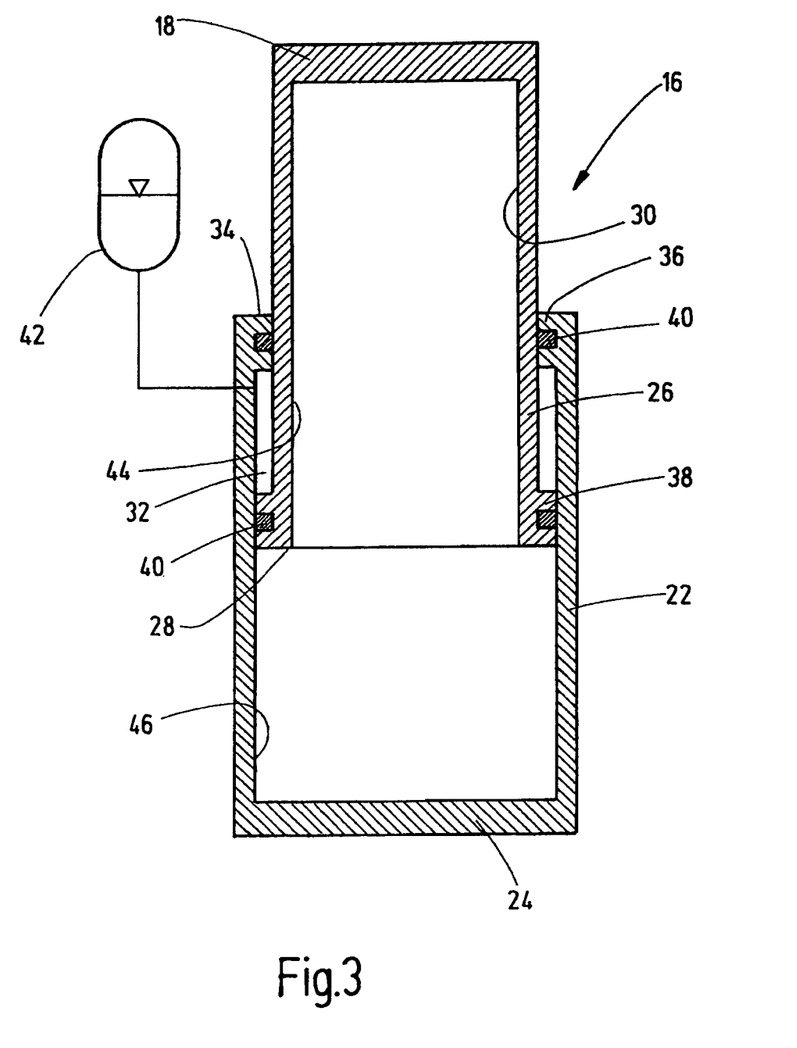
FIG. 3 is a schematically simplified, side elevational view in section of an accumulator cylinder according to a first exemplary embodiment of the invention.

FIG. 3, in a separate representation, shows details of the accumulator cylinder 16. As is apparent, the accumulator cylinder has the shape of a cup 22 with a closed bottom 24. Bottom 24 has a filler port, (not shown) for a working gas, in this example $N_2$. In the illustrated example, the end of the piston rod 18 forms the piston 26 in the form of a hollow body with an inner cavity 30 opening on the piston end 28. In the fully retracted position of the piston 26, when the piston end 28 is on the bottom 24 of the cup 22, piston 26 contains the entire volume of working gas. FIG. 3 shows the piston 26 more or less in the middle position in which the gas volume is composed of the inner space of the cup 22 free of the piston 26 and the cavity 30 of the piston 26.

The piston 26 is guided on the inner wall of the cup 22 of the accumulator cylinder 16 such that there is an oil gap 32 on the outside of the piston 26. For this purpose, a guide 36 for the piston 26 is on the open end 34 of the cup 22. On the open piston end 28, a second guide 38 is provided. Both guides 36, 38 ensure preservation of the oil gap 32 during piston movements. They are additionally each provided with a seal arrangement 40 so that together with oil filling of the oil gap 32 not only piston lubrication, but also a high pressure sealing system are formed. To compensate for the volume of the oil gap 32, which varies during piston movements, a hydraulic accumulator 42 is connected to the oil gap 32 and accommodates the oil displaced when the piston 26 is extended and releases it again when the piston 26 is retracted.

As mentioned, in FIG. 3 the piston 26 is in a middle position at which the load mass 4 is partially lowered. If the load mass 4 is completely lowered, the piston 26 moves in the direction of the bottom 24 of the cup 22 so that the piston end 28 in the end position of the lowering motion approaches the bottom 24. When the piston 26 is retracted, the working gas is compressed to a volume corresponding to the volume of the cavity 30 of the piston 26 in the fully retracted position. In this way, the potential energy of the load mass 4 released during lowering is converted into pressure energy in the accumulator cylinder 16. The fully retracted position of the piston 26 corresponds to the state of strongest compression and thus to the maximum heating of the working gas. At the same time, in the invention in this operating state, the heated working gas is enclosed double walled, because the piston wall 44 in this position extends over the entire length of the cup 22 along the cup wall 46. In addition, the medium collected in the oil gap 32 and extending essentially over the entire length of the cup 22 forms an additional insulating layer between the cup wall 46 and piston wall 44.

In the state of maximum heating, the accumulator cylinder 26 is thus at the same time in the state of best heat insulation. On the other hand, in the fully extended position of the piston 26, that is, a state in which as a result of expansion the working gas is in the most heavily cooled state, the piston 26 with almost the entire length of its piston wall 44 is outside the cup 22. Specifically, during the "supercooled" operating state, the accumulator cylinder 16 exhibits the highest value of the wall surface exposed to the exterior. The essentially entire surface of the cup wall 46 and the piston wall 44 is exposed so that a relatively large amount of heat can be absorbed from the ambient air. Therefore, the energy balance is good overall due to the low heat release for the "superheated" state and the high heat absorption for the "supercooled" state of the working gas in the invention.

Figure 4:
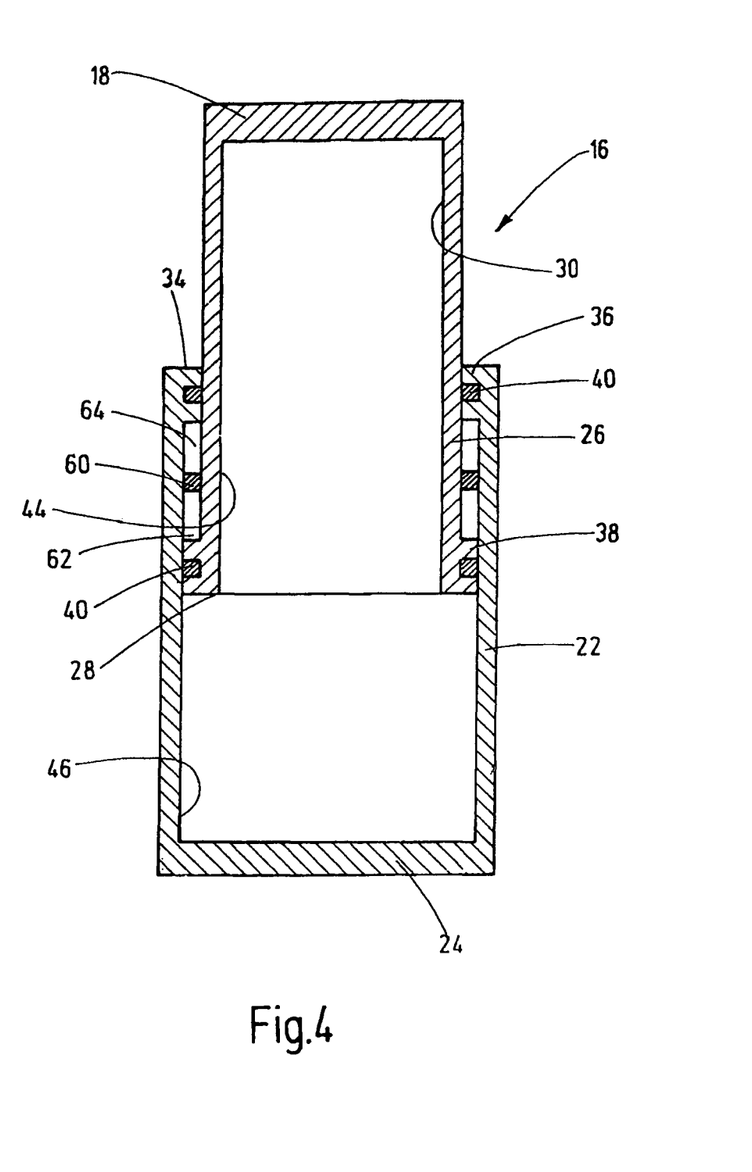
FIG. 4 is a schematically simplified, side elevational view in section of an accumulator cylinder a second exemplary embodiment of the invention.

FIG. 4 shows a second exemplary embodiment where there is no external hydraulic accumulator connected at the oil gap 32. Instead, the oil gap 32 does not contain a complete oil charge, but is divided into an oil side 62 containing an oil charge and a gas side 64 filled with nitrogen by a floating, that is, axially movable seal 60. In the movements of the piston 26, the oil gap thus forms a type of miniaturized hydraulic accumulator.

Figure 5:
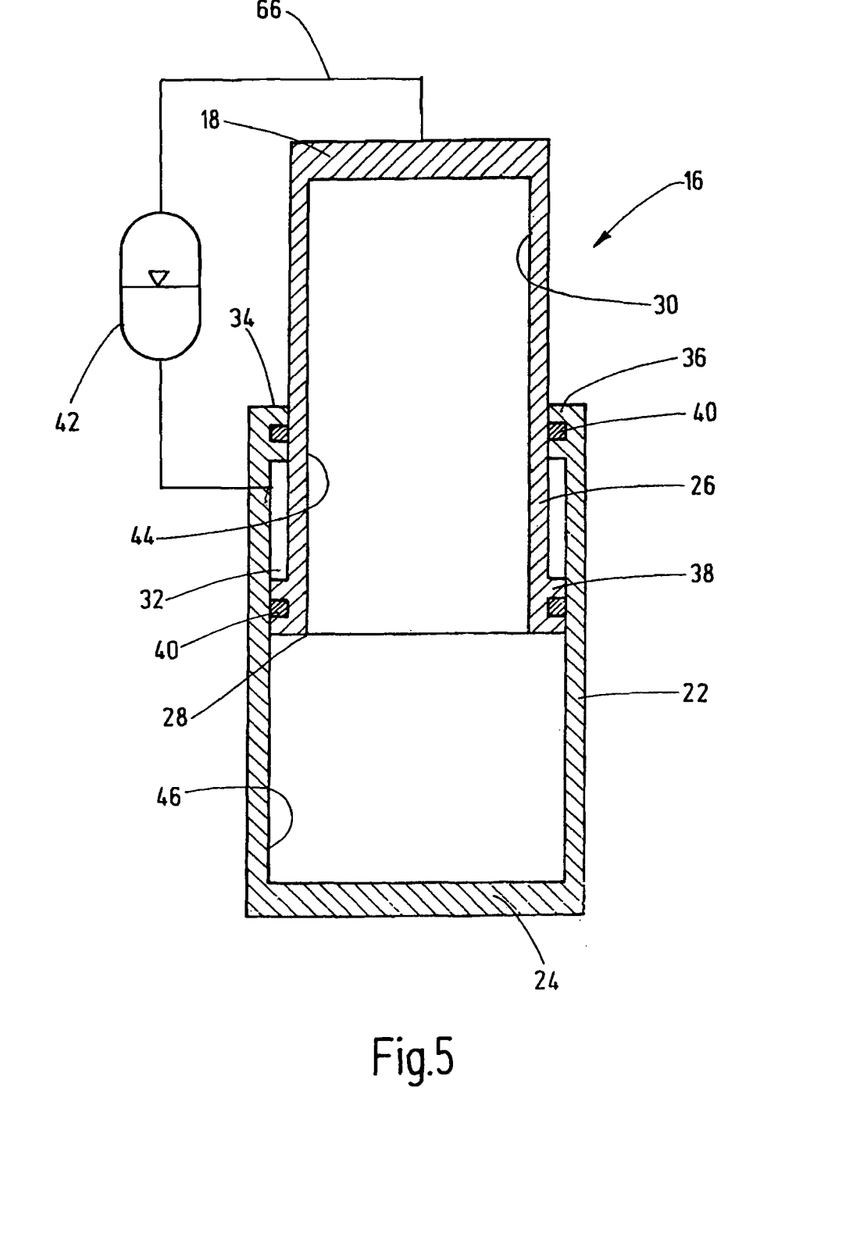
FIG. 5 is a schematically simplified, side elevational view in section of an accumulator cylinder according to a third exemplary embodiment of the invention.

FIG. 5 shows a further modified example according to a third exemplary embodiment, in which, with the hydraulic accumulator 42 connected to the oil gap 32, the accumulator's gas side is connected to the interior of the piston 26 via a charging line 66. The filling pressure of the accumulator 42 is then automatically held at the pressure level of the working cylinder 16. Pressure limitation and/or check valves (not shown) can be provided in the charging line 66 to dictate the filling pressure of the hydraulic accumulator 42 or convey it in one direction, if so desired. In a modification of this solution, line 66 can be advantageously connected to the bottom 24 of the accumulator cylinder 16, and not in the region of the upper, head-side cover of the piston rod 18, to provide a direct fluid-carrying connection between the interior of the working cylinder 16 and the accumulator 42, specifically, on the side of the accumulator 42 opposite the outlet site of the line leading to the space 32.

Figure 6:
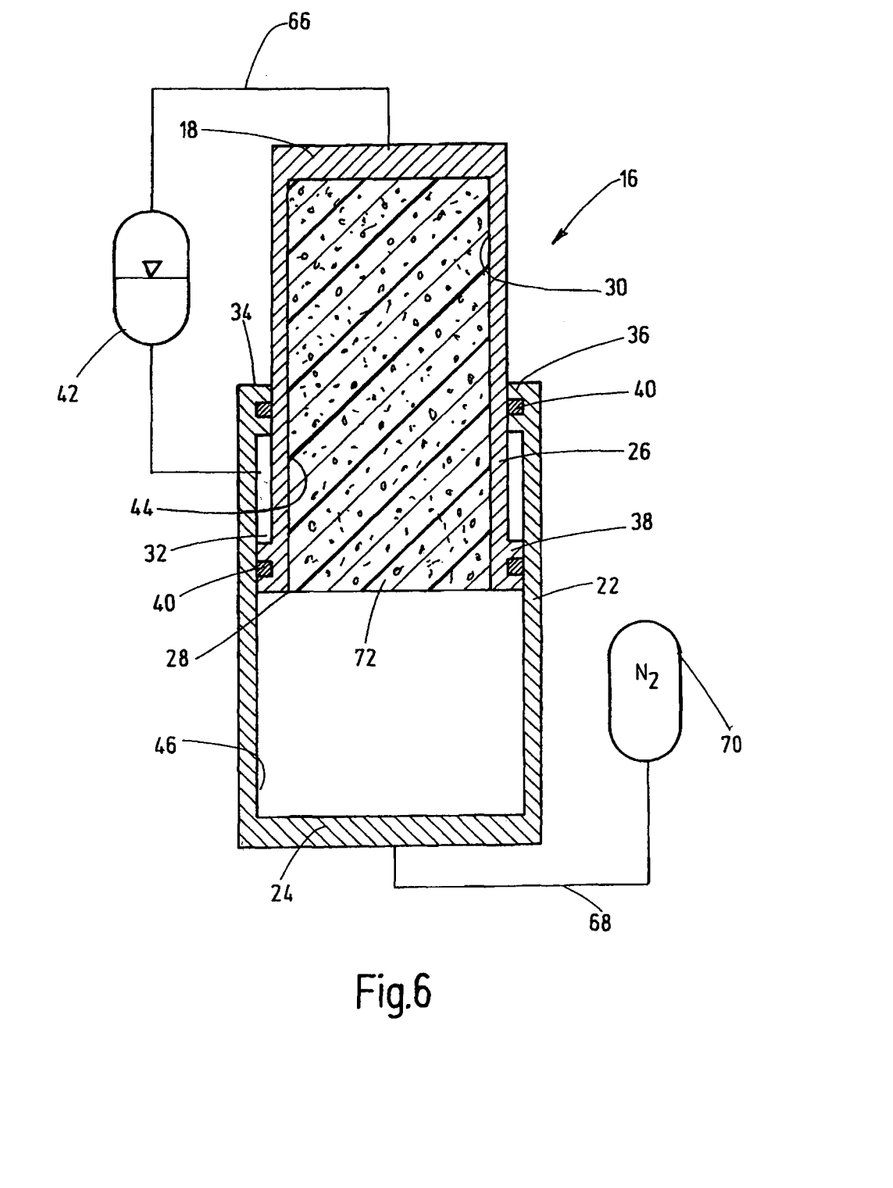
FIG. 6 is a schematically simplified, side elevational view in section of an accumulator cylinder according to a fourth exemplary embodiment of the invention.

FIG. 6 shows a fourth version in which the interior of the accumulator cylinder 6 is connected to a supply source 70 for working gas via a supply line 68. Moreover, to further improve heat insulation, the inner cavity 30 of the piston 26 is completely filled with a large-pore foam material 72 which can partially also accommodate the working gas.

In the highly schematically simplified representations of FIGS. 3 to 6, which illustrate only the operating principle, design details have been omitted. For example, a divided configuration of the open end 34 of the cup 22 enabling installation of the piston 26 or connections for delivery of the media into the oil gap 32 is not shown.

While various embodiments have been chosen to illustrate the invention, it will be understood by those skilled in the art that various changes and modifications can be made therein without departing from the scope of the invention as defined in the appended claims.

What is claimed is:

1. A device for recovering energy in working machines with at least one power drive actuatable to move a load mass back and forth and with an energy storage system absorbing energy released in movement of the load mass in a first direction and making that energy available for subsequent movement in a second direction, the device comprising:
    an accumulator cylinder mechanically coupled to the load mass, storing pneumatic pressure in the first direction and acting as an auxiliary working cylinder supporting the power drive in the second direction by converting stored pressure energy into a driving force, said accumulator cylinder including
        a cup having an open end and an inner surface,
        a piston movable within said cup and having an outside surface and an open end with said cup and said piston forming a main chamber in said accumulator cylinder,
        a first surface guide on said open end of said cup engaging said outside surface of said piston, guiding movement of said piston and spacing said outside surface of said piston from said inner surface of said cup at a distance,
        a second guide on said open end of said piston engaging said inner surface of said cup, guiding movement of said piston and spacing said outside surface of said piston from said inner surface of said cup at the distance, and
        an oil gap defined by and formed and maintained between said first and second guides and between said outside surface of said piston and said inner surface of said cup, and
        an axially movable seal in said oil gap separating an oil side with an oil charge from a gas side with a gas charge forming a hydraulic accumulator in said oil gap, said gas side being sealed and blocked from fluid communication with said main chamber.

2. A device according to claim 1 wherein said accumulator cylinder is an auxiliary working cylinder coupled to a load mass movable between raised and lowered positions and stores potential energy released in a lowering process as pneumatic energy.

3. A device according to claim 1 wherein said piston comprises a hollow piston rod having an inner chamber, said chamber containing essentially an entire volume of working gas in said accumulator cylinder in a fully retracted position of said piston in said cup.

4. A device according to claim 1 wherein said cup comprises a closed bottom having a filler port for a working gas.

5. A device according to claim 4 wherein said working gas is nitrogen gas.

6. A device according to claim 4 wherein said first guide extends radially inwardly and has a seal on a free end thereof; and
said second guide extends radially outwardly and has a seal on a free end thereof.

7. A device according to claim 1 wherein said accumulator cylinder comprises an auxiliary working cylinder mechanically shunted to a hydraulic working cylinder actuatable by a hydraulic system and used as the power drive.

8. A device according to claim 1 wherein said gas side is filled with nitrogen.

9. A device according to claim 1 wherein said piston comprises an inner chamber filed with a foam material.

10. A device according to claim 1 wherein said gas side and said oil side comprise separately sealed chambers within said oil gap without fluid connections to outside said oil gap.

11. A device according to claim 1 wherein said gas side comprises a chamber sealed from an exterior of said piston.

12. A device according to claim 1 wherein said cup has a hollow interior extending from said open end thereof;
said piston has a hollow interior extending coaxially from said open end thereof and opening on said hollow interior of said cup.

13. A device according to claim 1 wherein each of said cup and said piston has a closed end opposite said first end thereof; and
said first and second guides extend radially inwardly and outwardly, respectively, relative to longitudinal axes of said cup and said piston and have axially facing surfaces defining axial end of said oil gap.

14. A device according to claim 13 wherein said first and second guides have first and second seals, respectively, mounted on radial free ends thereof.

15. A device for recovering energy in working machines with at least one power drive actuatable to move a load mass back and forth and with an energy storage system absorbing energy released in movement of the load mass in a first direction and making that energy available for subsequent movement in a second direction, the device comprising:
    an accumulator cylinder mechanically coupled to the load mass, storing pneumatic pressure in the first direction and acting as an auxiliary working cylinder supporting the power drive in the second direction by converting stored pressure energy into a driving force, said accumulator cylinder including
        a cup having an open end and an inner surface with a first diameter surrounding a hollow interior extending from said open end of said cup,
        a piston movable within said cup and having a piston rod including an outer surface with a second diameter less than said first diameter to define an oil gap between said outer surface of said piston rod and said inner surface of said cup, said cup and said piston forming a main chamber in said accumulator cylinder, said piston rod having a hollow inner chamber extending from an open end of said piston and being open to said hollow interior of said cup, and an axially movable seal in said oil gap separating an oil side with an oil charge from a gas side with a gas charge forming a hydraulic accumulator in said oil gap, said gas side being sealed and blocked from fluid communication with said main chamber.

16. A device according to claim 15 wherein
said inner chamber is filled with a foam material.

17. A device according to claim 15 wherein
a first guide is on an open end of said cup and engages said outer surface of said piston rod; and
a second guide is on an axial end of said piston rod and engages said inner surface of said cup, said oil gap being defined between said first and second guides.

18. A device according to claim 15 wherein
said first guide extends radially inwardly and has a seal on a free end thereof; and
said second guide extends radially outwardly and has a seal on a free end thereof.

19. A device according to claim 15 wherein
said gas side and said oil side comprise separately sealed chambers within said oil gap without fluid connections to outside said oil gap.

20. A device according to claim 15 wherein
said gas side comprises a chamber sealed from an exterior of said piston.

21. An accumulator cylinder, comprising:
a cup having an open end and an inner surface defining a main chamber;
a piston movable within said cup and having an outside surface and an open end and an opposite closed end, said cup and said piston forming a main chamber;
a first guide on said open end of said cup engaging said outside surface of said piston, guiding movement of said piston and spacing said outside surface of said piston from said inner surface of said cup at a distance;
a second guide on said open end of said piston engaging said inner surface of said cup, guiding movement of said piston and spacing said outside surface of said piston from said inner surface of said cup at the distance;
an oil gap defined by and formed and maintained between said first and second guides and between said outside surface of said piston and said inner surface of said cup; and
an axially movable seal in said oil gap separating an oil side with an oil charge from a gas side with a gas charge forming a hydraulic accumulator in said oil gap, said gas side being sealed and blocked from fluid communication with said main chamber.

22. A device according to claim 21 wherein
said gas side and said oil side comprise separately sealed chambers within said oil gap without fluid connections to outside said oil gap.

23. A device according to claim 21 wherein
said gas side comprises a chamber sealed from an exterior of said piston.

24. A device according to claim 21 wherein
said cup has a hollow interior extending from said open end thereof;
said piston has a hollow interior extending coaxially from said open end thereof and opening on said hollow interior of said cup.

25. A device according to claim 21 wherein
said cup has a closed end opposite said open end thereof; and
said first and second guides extend radially inwardly and outwardly, respectively, relative to longitudinal axes of said cup and said piston and have axially facing surfaces defining axial end of said oil gap.

26. A device according to claim 25 wherein
said first and second guides have first and second seals, respectively, mounted on radial free ends thereof.

* * * * *